No. 729,808. PATENTED JUNE 2, 1903.
W. F. TAYLOR & J. T. WILLIAMS.
PLANTER ATTACHMENT FOR CULTIVATORS.
APPLICATION FILED AUG. 2, 1902.
NO MODEL. 2 SHEETS—SHEET 1.
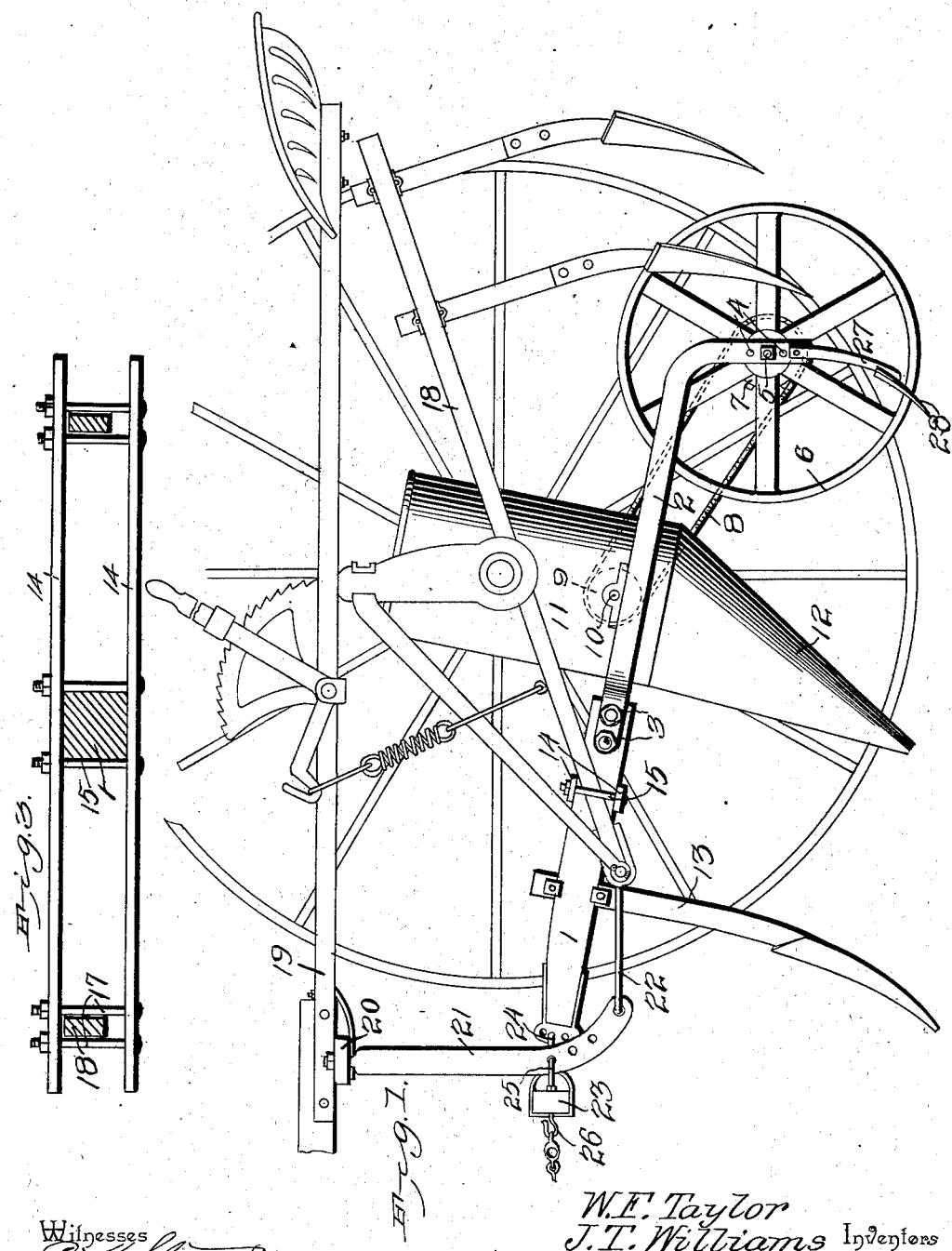
Witnesses
W. F. Taylor
J. T. Williams Inventors
by C. A. Snow & Co
Attorneys

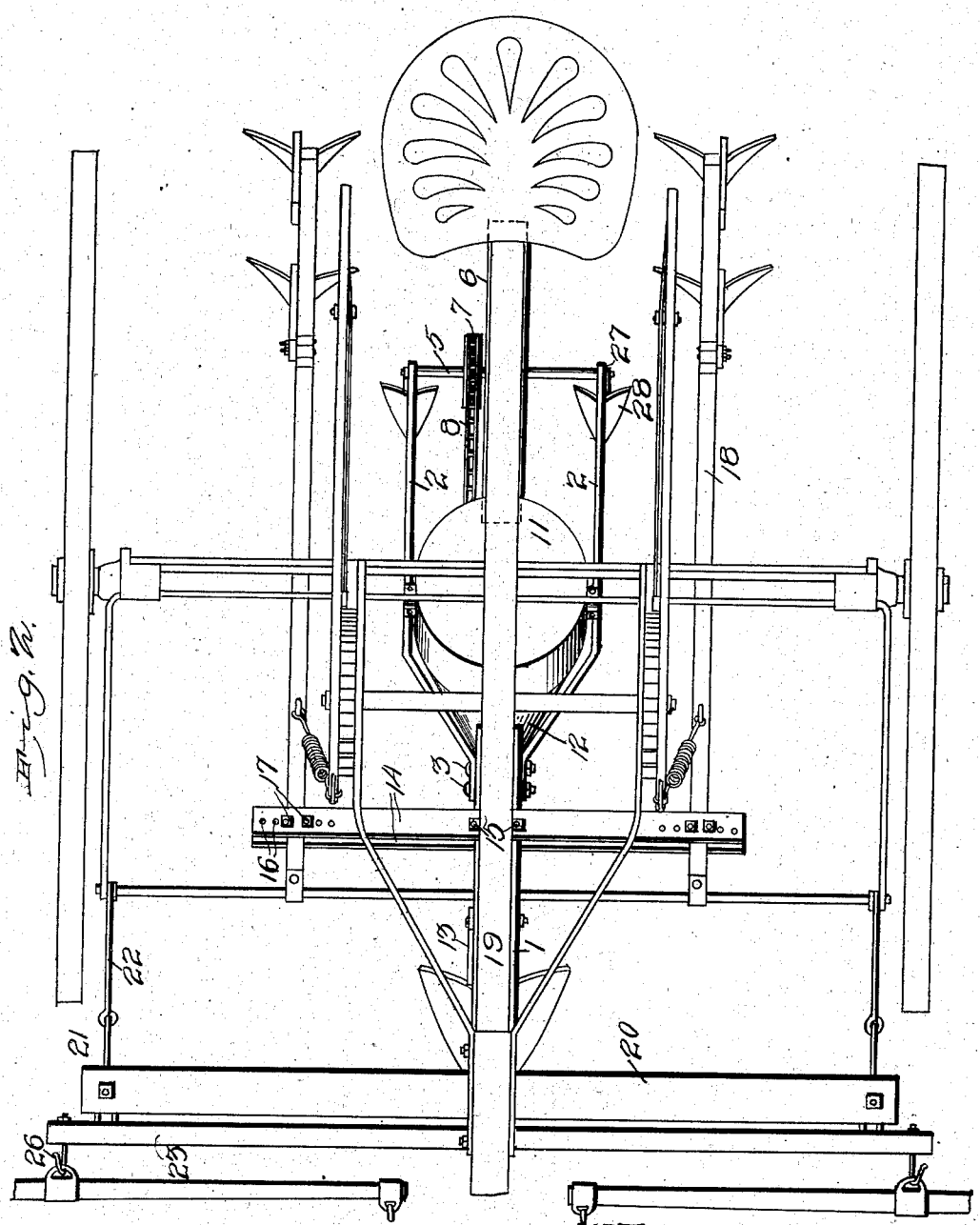

No. 729,808. Patented June 2, 1903.

UNITED STATES PATENT OFFICE.

WILLIAM F. TAYLOR AND JOHN T. WILLIAMS, OF RENO, TEXAS.

PLANTER ATTACHMENT FOR CULTIVATORS.

SPECIFICATION forming part of Letters Patent No. 729,808, dated June 2, 1903.

Application filed August 2, 1902. Serial No. 118,135. (No model.)

*To all whom it may concern:*

Be it known that we, WILLIAM F. TAYLOR and JOHN T. WILLIAMS, citizens of the United States, residing at Reno, in the county of Parker and State of Texas, have invented a new and useful Planter Attachment for Cultivators, of which the following is a specification.

This invention relates to planter attachments for cultivators; and it has for its object to provide a device of this class which shall possess superior advantages in point of simplicity, durability, and general efficiency.

With these ends in view our invention consists generally in the improved mode of attachment to be hereinafter described whereby the device as a whole shall be simplified and rendered convenient and effective in operation.

The invention further consists in certain improvements in the construction, arrangement, and combination of the component parts thereof, which will be hereinafter fully described, and particularly pointed out in the claims.

In the accompanying drawings, Figure 1 is a side view of a cultivator provided with a planter attachment according to our invention, the near wheel having been removed. Fig. 2 is a plan view. Fig. 3 is a detail transverse sectional view.

Corresponding parts in the several figures are indicated by like numerals of reference.

The planter attachment of our invention comprises the draft-beam 1, to the rear end of which brackets 2 2 are connected by means of transverse connecting means 3. The brackets 2 2 are extended downwardly at their rear ends and provided with perforations 4, forming bearings for an axle 5, which may be adjusted in any of said perforations and which carries the traction-wheel 6. The axle 5 likewise carries a sprocket-wheel 7, which is connected by means of a chain 8 to the sprocket-wheel 9 upon a shaft 10, which passes transversely through the seedbox or hopper 11 and which operates the seeding mechanism contained within said hopper. The latter is supported between the brackets 2 2, and it is provided in the usual manner with the seed-tube 12. The furrow-opener may be attached to the seed-tube, or it may, as shown in the drawings, be attached to a stock 13, vertically adjustable in the draft-beam 1.

14 14 designate a pair of heavy iron straps which extend across the upper and under sides of the beam 1, upon which the said straps are securely clamped by means of bolts 15. The outer ends of the straps 14 are each provided with a plurality of alining perforations 16 to receive the guide-bolts 17, pairs of which connect the straps 14 at a suitable distance from their ends. These guide-bolts serve to confine the cultivator-beams 18, which extend between them and the straps 14, on either side of the draft-beam 1. The play between these parts is sufficient to enable the cultivator-beams to be raised to some extent independently of the draft-beam 1 when it shall be desired to do so. Beyond such point the draft-beam and planter attachment will follow and be likewise raised from the ground.

19 designates the cultivator-tongue, which rests in the usual manner upon the cross-beam 20, which is provided at its ends with downwardly-extending brackets 21, the lower ends of which have suitable connection, usually by intermediate links 22, with the front ends of the cultivator-beams. A doubletree 23 is connected by means of a clevis 24 to the front end of the draft-beam 1, and the ends of said doubletree are likewise connected by means of clevises 25 or in any other suitable manner with the lower ends of the brackets 21, and through them with the front ends of the cultivator-beams. The ends of the doubletree are provided in the usual manner with means, such as hooks 26, for the attachment of the draft.

The brackets 2 2 of the planter may be provided with standards 27, at the lower ends of which coverers 28 may be mounted; but this is not necessary, inasmuch as the cultivator-blades proper may be used for covering the seed dropped. As regards the seed-dropping mechanism, it may be of any desired construction. It may be adapted for planting cotton, corn, or other seeds, and when a corn-planter it may be adapted for check-rowing or for listing.

The hinge connection between the draft-beam and the brackets that support the seed-box enable the latter to adjust itself to obstructions and inequalities in the ground without danger of injury.

Having thus described our invention, we claim and desire to secure by Letters Patent of the United States—

1. The combination with a cultivator, of a draft-beam disposed between the cultivator-beams, a planter connected with said draft-beam, straps secured transversely across the latter, and guide-bolts connecting said straps and confining the cultivator-beams.

2. The combination with a cultivator, of a draft-beam disposed between the cultivator-beams, brackets connected with the rear end of said draft-beam, a planter supported upon said brackets, straps secured transversely across the draft-beam, and bolts connecting said slots and forming guides confining the cultivator-beams.

3. The combination with a cultivator, of a planter having a draft-beam disposed between the cultivator-beams, straps secured transversely across said draft-beam and connected by guides confining the cultivator-beams, a doubletree connected with the front end of the draft-beam and draft connections between the ends of said doubletree and the front ends of the cultivator-beams.

In testimony that we claim the foregoing as our own we have hereto affixed our signatures in the presence of two witnesses.

WILLIAM F. TAYLOR.
JOHN T. WILLIAMS.

Witnesses:
J. A. McCrary,
H. S. Swift.